(No Model.) 3 Sheets—Sheet 2.
J. T. VAN POOL.
COMBINED HARROW AND ROLLER.
No. 395,366. Patented Jan. 1, 1889.
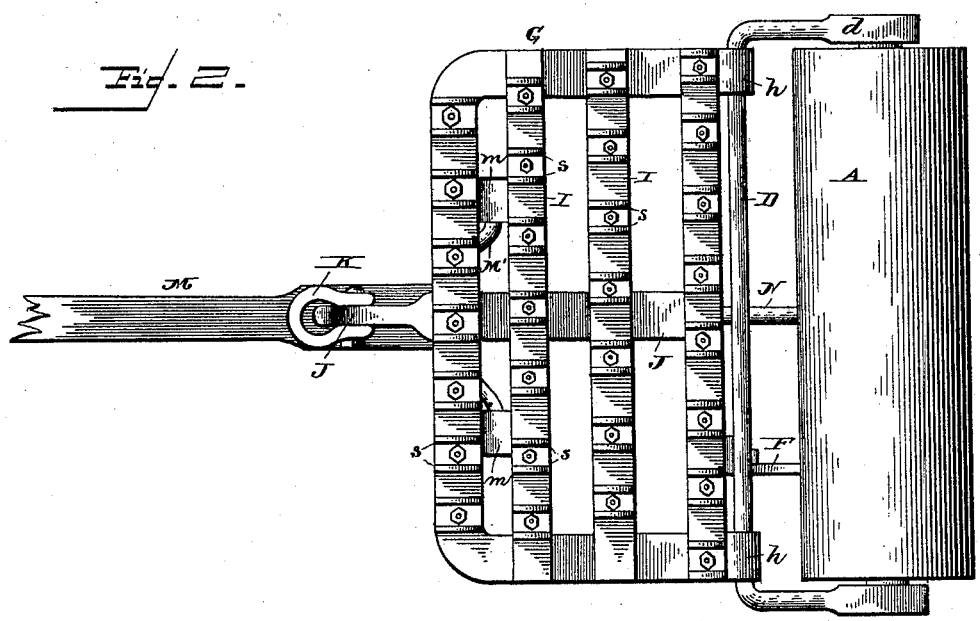
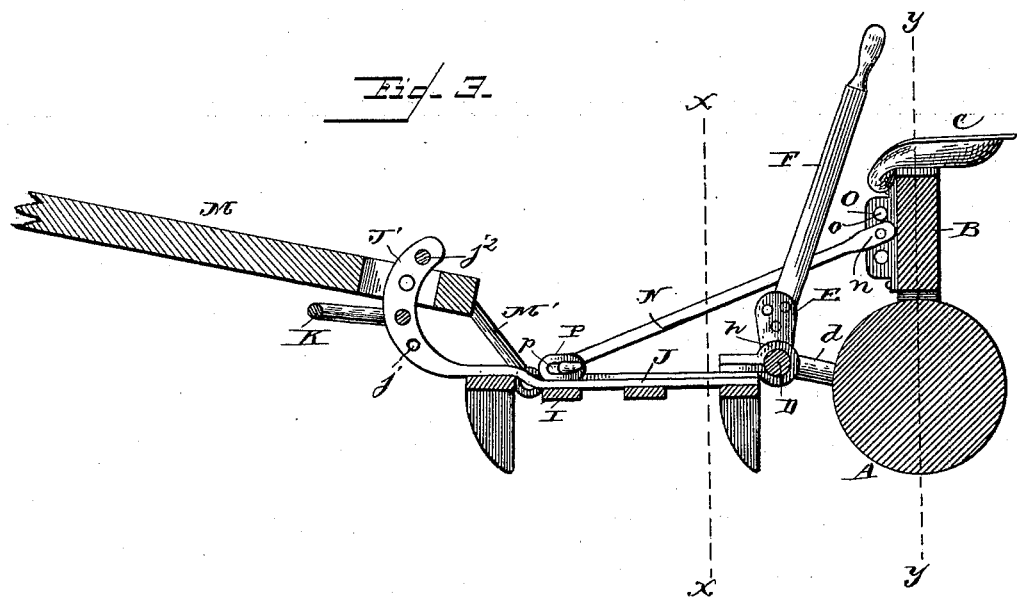
WITNESSES
Edwin L. Yewell.
Wm. J. Littell,
INVENTOR
John T. Van Pool.
by J. R. Littell,
Attorney (No Model.) 3 Sheets—Sheet 3.
J. T. VAN POOL.
COMBINED HARROW AND ROLLER.
No. 395,366. Patented Jan. 1, 1889.
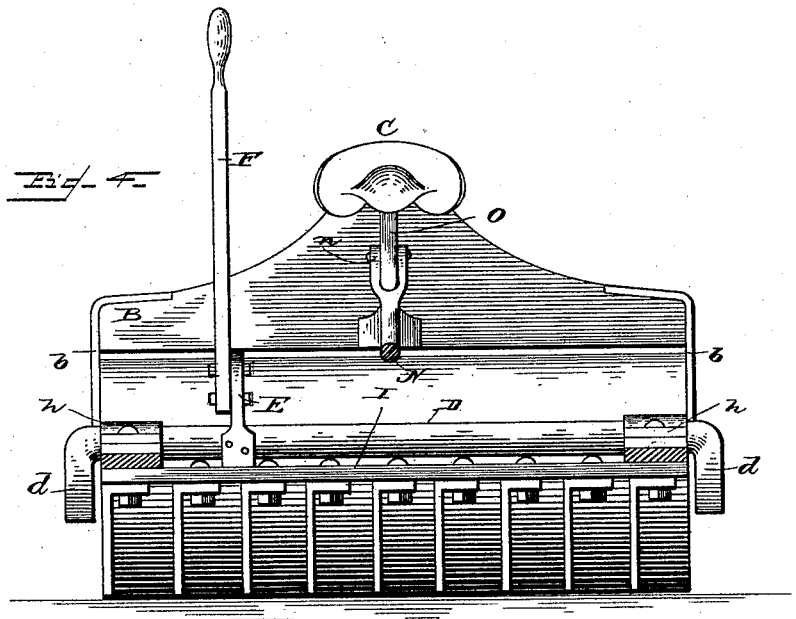
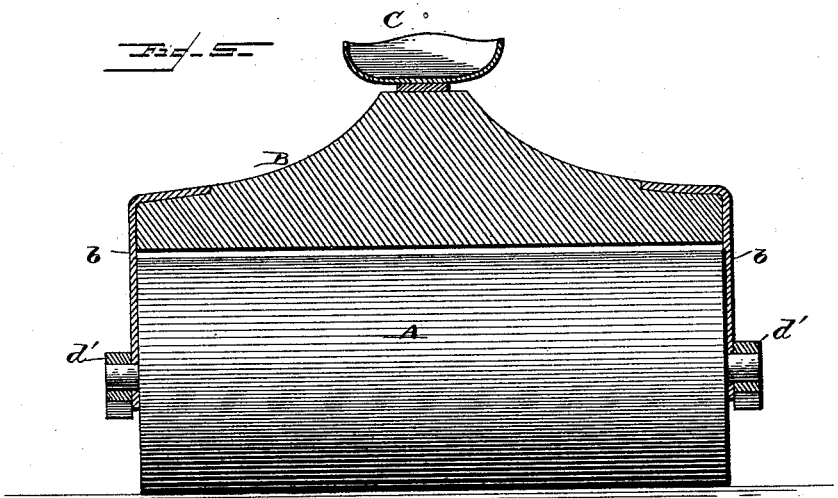
WITNESSES
Edwin I. Yewell.
Wm. J. Little.
INVENTOR
John T. Van Pool.
by J. R. Littell,
Attorney

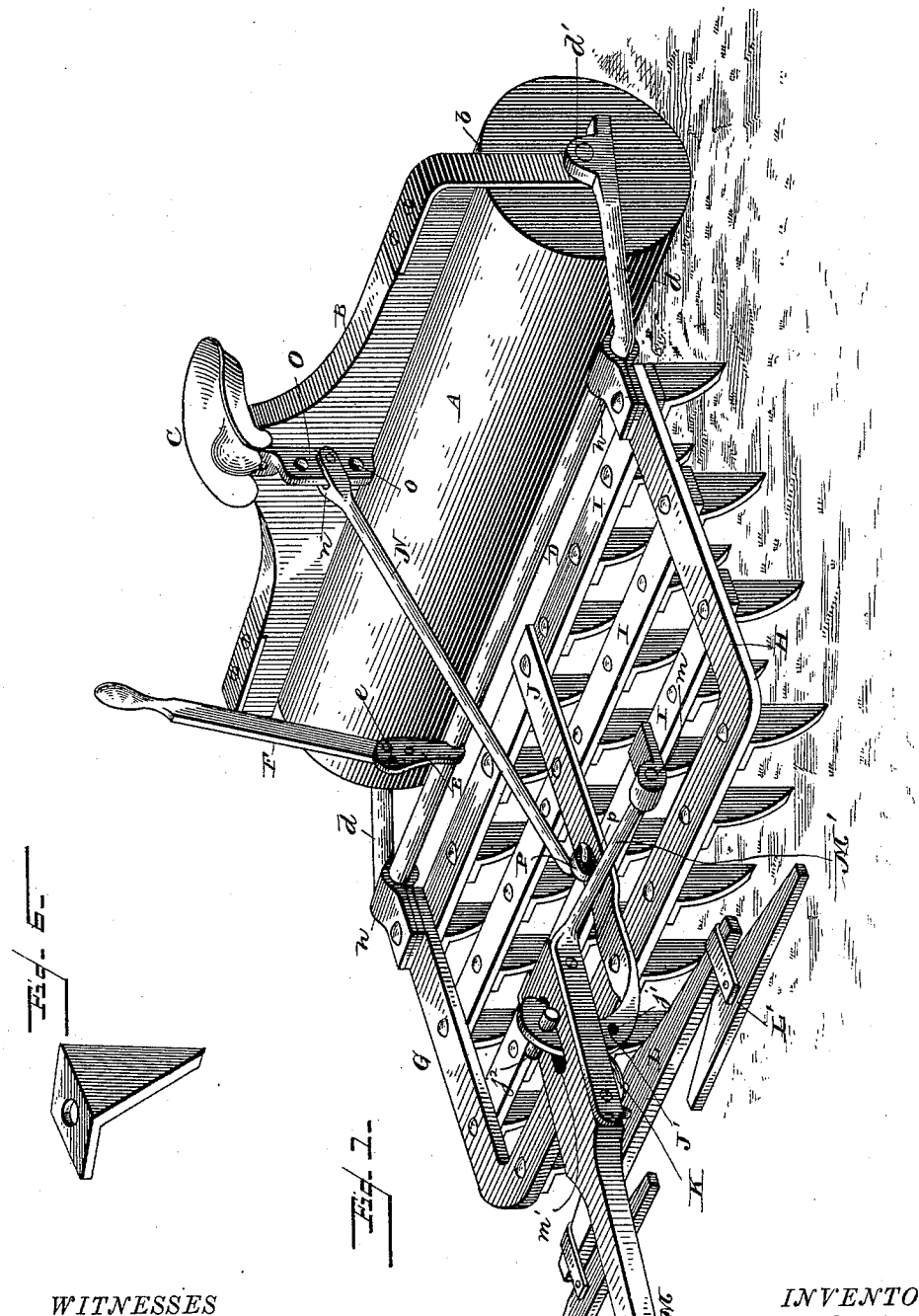

UNITED STATES PATENT OFFICE.

JOHN T. VAN POOL, OF TIPTONVILLE, TENNESSEE.

COMBINED HARROW AND ROLLER.

SPECIFICATION forming part of Letters Patent No. 395,366, dated January 1, 1889.

Application filed April 28, 1888. Serial No. 272,201. (No model.)

*To all whom it may concern:*

Be it known that I, JOHN T. VAN POOL, a citizen of the United States, residing at Tiptonville, in the county of Lake and State of Tennessee, have invented certain new and useful Improvements in a Combined Harrow and Roller, of which the following is a specification.

This invention relates to a combined harrow and roller; and its object is to provide a simple and improved device of this character possessing advantages in point of simplicity, inexpensiveness, durability, and general efficiency.

In the drawings, Figure 1 is a perspective view of a combined harrow and roller embodying my invention. Fig. 2 is a bottom or inverted plan view. Fig. 3 is a vertical longitudinal sectional view. Fig. 4 is a vertical transverse sectional view on the line $x\,x$, Fig. 3. Fig. 5 is a vertical transverse sectional view on the line $y\,y$, Fig. 3. Fig. 6 is a detail perspective view of one of the harrow-teeth.

Corresponding parts in the figures are denoted by the same letters of reference.

Referring to the drawings, A designates a roller, which is journaled in bearings in the downwardly-extending arms $b\,b$ of a cross-beam, B, having a seat, C, mounted thereon for the operator.

D designates a rod or bar having its end portions, $d\,d$, bent at right angles to the main portion and provided with bearing-blocks $d'\,d'$, engaging the ends of the axes of the roller. Projecting at right angles to the main portion of the bar D is an arm, E, provided with a series of perforations, $e$, to which is bolted at the desired angle the perforated lower end of a lever, F.

G designates the harrow, comprising, preferably, an approximately U-shaped frame, H, having bearing-plates $h$ bolted to the ends thereof and engaging the bar D, and transverse bars or beams I, bolted or otherwise secured at their ends to the frame H, carrying the harrow-teeth. These teeth are preferably formed by right-angular plates, one portion of which is beveled, forming the teeth proper, while the other portion is provided with an eye, through which they are bolted to the transverse bars or beams I, and are so disposed thereon that each tooth will be in a different longitudinal plane. The teeth may be formed by a plate having both ends bent at right angles to the central portion, thus providing a double tooth, as shown at S, Fig. 2.

A rod or bar, J, is bolted to the bars or beams I at right angles thereto, and terminates at its front end in an upwardly-projecting segmental arm, J', provided with a series of eyes or perforations, $j'$, through one of the lower ones of which a clevis, K, is bolted. A doubletree, L, may be connected to the clevis, having singletrees L' L' at its ends.

A tongue, M, is provided, having divergent rods or arms M' M' provided at its rear ends, the free ends of said rods or arms being bent at right angles to the tongue, and are located in bearing-plates $m\,m$, secured to one of the beams I. A vertical slot, $m'$, is provided through the rear end of the tongue, through which projects the segmental arm J'. The free upward play of the tongue in its bearings is regulated by a pin, $j^2$, engaging one of the upper eyes or perforations, $j'$, above the tongue.

N designates a rod or bar connected at its rear bifurcated end, $n$, with a vertical plate, O, secured to the beam B by a bolt passing through said end and through one of a series of eyes or perforations, $o$, in said plate. The front end of the rod or bar N is hook-shaped and removably engages an elongated slot, $p$, in a projection, P, on the rod or bar J.

The operation and advantages of my invention will be readily understood by those skilled in the art to which it appertains. By operating the lever the harrow can be raised, throwing the weight of the same upon the roller for the purpose of freeing the harrow from all obstruction, while the relation of the harrow to the ground can be regulated by the adjustment of the clevis, tongue, and rod or bar N.

It will be obvious that the harrow may be used exclusive of the roller by removing the bolts securing the bearing-plates $h$ and releasing the rod or bar N from engagement with the slot in the projection P.

I claim as my invention—

1. In a combined harrow and roller, the combination, with the frame provided with an arm projecting therefrom, of a lever adjustably secured to said arm, substantially as set forth.

2. The combination, in a combined harrow and roller, with the roller, a beam connected therewith provided with an apertured plate, and a harrow connected with said roller and provided with a slotted lug, of a bar secured at its rear end to the apertured plate and having its front end engaging the apertured lug, substantially as set forth.

3. The combination, in a combined harrow and roller, with the roller, the connecting-frame, and the harrow, of bearing-plates removably secured to said harrow and engaging the frame, substantially as set forth.

4. The combination, in a combined harrow and roller, with the roller, a horizontal frame having bearings at its ends for the same, a lever for adjusting said frame, and a harrow connected with the latter, of a beam connected with the roller-axes and provided with a seat and an adjustable bar connecting said beam and harrow, substantially as set forth.

5. The herein-described harrow and roller, consisting of the roller, a beam connected with the axes thereof and provided with a seat and an apertured plate, a frame having bearings at its ends for said axes and provided with an adjusting-lever, a harrow connected with said frame and carrying an adjustable tongue, a slotted lug on said harrow, and a bar adapted to adjustably engage said lug and the said apertured plate, substantially as set forth.

In testimony whereof I affix my signature in presence of two witnesses.

JOHN T. VAN POOL.

Witnesses:
POWHATAN DAVIS,
LEWIS MOODY.